United States Patent [19]
Ford et al.

[11] Patent Number: 6,101,499
[45] Date of Patent: Aug. 8, 2000

[54] METHOD AND COMPUTER PROGRAM PRODUCT FOR AUTOMATICALLY GENERATING AN INTERNET PROTOCOL (IP) ADDRESS

[75] Inventors: Peter S. Ford, Carnation; Pradeep Bahl; Jawad Mohamed J. Khaki, both of Redmond; Greg Burns, Carnation; Frank J. Beeson, Seattle, all of Wash.

[73] Assignee: Microsoft Corporation, Redmond, Wash.

[21] Appl. No.: 09/057,135

[22] Filed: Apr. 8, 1998

[51] Int. Cl.[7] ..................................................... G06F 15/16
[52] U.S. Cl. .................................... 707/10; 707/10; 707/2
[58] Field of Search ............................. 709/10, 222, 225, 709/226, 228, 243, 245; 395/500

[56] References Cited

U.S. PATENT DOCUMENTS 5,812,819  9/1998  Rodwin ................................... 395/500
5,854,901  12/1998  Cole ........................................ 709/245
5,884,038  3/1999  Kapoor .................................... 709/226

OTHER PUBLICATIONS

*RFC 791;* Internet Protocol; DARPA Internet Program Protocol Specification; Information Sciences institute; Sept. 1981.
*RFC 950;* Internet Standard Subnetting Procedure; J. Mogul (Stanford) and J. Postel (ISI); Aug. 1985.
*RFC 1531;* Dynamic Host Configuration Protocol; R. Droms; Bucknell University; Oct. 1993.

*Primary Examiner*—Wayne Amsbury
*Assistant Examiner*—Mark Terry
*Attorney, Agent, or Firm*—Workman, Nydegger & Seeley

[57] ABSTRACT

A method and computer product for automatically generating an IP network address that facilitates simplified network connection and administration for small-scale IP networks without IP address servers, such as those found in a small business or home network environment. First, a proposed IP address is generated by selecting a network identifying portion (sometimes known as an IP network prefix) while deterministically generating the host identifying portion based on information available to the IP host. For example, the IEEE 802 Ethernet address found in the network interface card may be used with a deterministic hashing function to generate the host identifying portion of the IP address. Next, the generated IP address is tested on the network to assure that no existing IP host is using that particular IP address. If the generated IP address already exists, then a new IP address is generated, otherwise, the IP host will use the generated IP address to communicate over the network. While using the generated IP address, if an IP address server subsequently becomes available, the host will conform to IP address server protocols for receiving an assigned IP address and gradually cease using the automatically generated IP address.

35 Claims, 6 Drawing Sheets

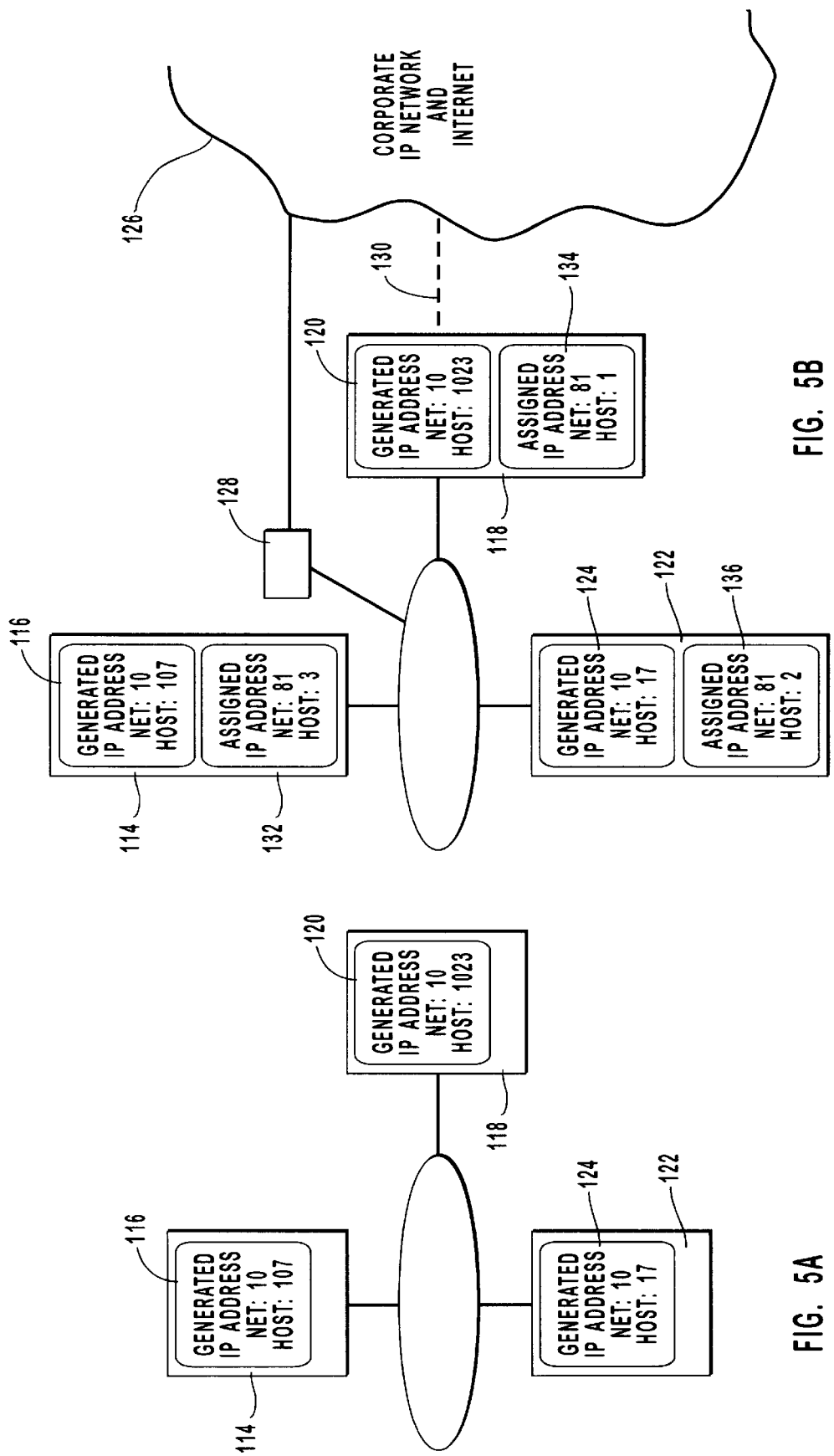

METHOD AND COMPUTER PROGRAM PRODUCT FOR AUTOMATICALLY GENERATING AN INTERNET PROTOCOL (IP) ADDRESS

BACKGROUND OF THE INVENTION

1. The Field of the Invention

The field of the invention is the automatic generation of network addresses by a host or node on the network so that explicit assignment is unnecessary. More particularly, the present invention relates to automatic address generation for networks according to the Internet Protocol or IP networks.

2. Present State of the Art

When networking a number of computing devices, such as conventional personal computers (PCs), mainframe and mini computers, or other computational devices, it is necessary for each node or host on the network to have a unique network protocol address as well as a physical link address to allow communication between the different nodes at the networking level of the ISO layered network model. A network protocol address is distinguishable and separate from the physical link address used at the physical link layer of the ISO model since a network protocol may operate over any physical link. For example, an Ethernet address corresponding to the IEEE 802 standard found in the network interface cards common to conventional PCs is a physical link address, not a network protocol address such as an IP address. In this manner, a network protocol is independent of the actual physical implementation used to transport data between the different nodes of the network.

A network protocol address may be obtained for each node of the network in one of several ways depending on the protocol capabilities and the desire for administrative interaction. A network protocol address may be manually assigned by a network administrator before bringing the node or host on-line. Another method allows a single node on the network to act as a network protocol address server whereby a newly attached node may request and receive a network protocol address according to a predefined convention. Finally, a node or host may automatically generate a network protocol address and begin communicating across the network.

Automatically generating a network protocol address has certain advantages over other methods of obtaining a network protocol address in certain situations, such as a small business environment or a corporate department having a Local Area Network (LAN) isolated from other corporate networks. For example, to manually assign the network protocol address requires some minimal amount of networking knowledge to track and assure that there are not conflicting network protocol addresses. Besides requiring a certain amount of networking expertise, this can sometimes be a tedious and imperfect task. Having a network protocol address server in many instances requires additional software to be installed and often a network administrator, again, something that is not desirable for reasonably small networks of two to ten nodes, such as those found in a small business environment.

Some network protocols facilitate automatic network protocol address generation by incorporating a unique identifier, such as the Institute of Electrical and Electronic Engineers (IEEE) 802 Ethernet address commonly found in network interface cards, into the network protocol address in order to reduce or eliminate the possibility of conflict with other automatically generated network protocol addresses. The IEEE 802 standard has a 48 bit (6 octet) address that is designed to be globally unique amongst every Ethernet compatible device manufactured. The administering organization assigns 24 bits (3 octets) to manufacturing organizations who in turn serialize the devices as they are produced.

If the network protocol is designed to run on top of physical layers besides Ethernet, such as Token Ring, etc., then some other way of automatically generating the network protocol address that does not resort to using the IEEE 802 Ethernet standard is used. In many practical instances, however, a homogenous Ethernet environment is used exclusively.

With respect to Internet Protocol or IP networks, the address base for an IP address is too small to simply include the uniquely available network interface card IEEE 802 Ethernet address as part of the IP address. In IP version 4, the predominant protocol for the Internet, an IP address will only contain 32 bits (4 octets) of information to identify the particular host. Structurally, the IP address is broken into a network identifying portion (also known as an IP network prefix), a host identifying portion, and some bits used to identify one of three different formats of the IP address. Effectively, there are only 8 to 24 bits available to identify the host on a particular network depending on which format is used. Using a part of the IEEE 802 Ethernet address as would not, therefore, guarantee a unique address for each host on the IP network.

Historically, IP addresses have been manually assigned or made available through an IP address server, while other forms of network protocols, such as Novell's IPX, predominately use automatic generation to determine the network protocol address. IP networks are increasingly important and make up the Internet that has become a standard for global network communications. One protocol that is used to assign addresses to IP hosts from an IP address server available on the network is the Dynamic Host Configuration Protocol (DHCP). DHCP is defined by RFC 1531 and is hereby incorporated by reference. While DHCP and other address assignment protocols eliminate the need for manual IP address configuration and management, they still do not provide the benefits of automatic network address generation.

What is needed is a reliable way to automatically generate an IP address so that an IP host may be easily connected into an IP network without requiring any networking expertise. Such automatic generation of an IP address will need to uniquely define the IP address so as to minimize conflicting usage with existing network addresses. Additionally, the method will need safeguards against creating the same IP address on different IP hosts that may also result conflicting usage. Finally, a robust implementation for automatically generating an IP address would easily integrate with IP networks where an address server exists or later becomes available so that the automatic generation only occurs when necessary and ceases when an IP address may be attained through more traditional channels. A way of generating an IP address that addresses the above-mentioned problems would allow a department of a corporation to easily set up a department IP network that can later be easily integrated into the existing corporate IP network scheme and also onto the Internet itself.

SUMMARY AND OBJECTS OF THE INVENTION

It is an object of the present invention to automatically generate an IP address for a host without manual intervention or without resort to an IP address server.

It is another object of the present invention to allow hosts to connect to an IP network in a simple fashion.

It is a further object of the present invention to reduce the expertise needed by a user connecting an IP host to an IP network.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method and computer program product for automatically generating an IP address is provided. One important example of an IP network particularly suited for the present invention would be the small business network having 2–10 host nodes on a cable that is isolated from any other network. In this scenario, the user simply desires to make the necessary hardware connections, boot up the various hosts (typically personal computers or workstations), and have the network communication capability in place automatically without having to install and maintain a IP address server, such as a DHCP server, hire a network administrator, or otherwise have added configuration burden for setting up the network.

The present invention overcomes the limitations in the prior art by ascertaining the absence of a network IP address server, such as a DHCP server, automatically generating an IP address, testing the IP address to determine uniqueness, and periodically determining if an IP address server subsequently becomes available on the IP network. In this embodiment, the invention may be used in a network that has or does not have an IP address server. Furthermore, it will give priority to the IP address server whenever present so that the generated IP address is only used when necessary.

The automatic generation of the IP address occurs by first selecting a network identifying portion in a consistent fashion. Due to the fact that the value of "10" ("net 10") has been assigned by the Internet Assigned Numbers Authority ("IANA") for use by private IP networks in conformance to RFC 1918, one embodiment of the invention will always select this value for the network identifying portion of the generated IP address.

An alternative embodiment will use a "reserved" or "assigned" network number for the network identifying portion of an IP network address. Such a reserved number would be a globally well known network identifying portion that has been previously allocated by the IANA to be used for automatically generated IP network addresses. For example, the IANA has currently assigned the network identifying portion 169.254 for automatically generated IP network addresses.

Next, a host identifying portion is generated deterministically based on information available to the host. For example, the IEEE 802 Ethernet address found in the network interface card may be used with a deterministic hashing function to generate the host identifying portion of the network address. The deterministic nature of the hashing algorithm will help insure consistency so that the same IP address is generated each time for the same hardware host.

Since there is a slight chance that duplicate network addresses may created, an IP address is tested on the network to assure that only one host is using that particular IP address. If the IP address already exists, then a new host identifying portion is generated and the IP address is again tested. This process will continue for a predetermined number of iterations or until a unique address is generated.

If an IP address server subsequently becomes available, the host will conform to the IP address server protocols for receiving an assigned IP address and gradually cease using the automatically generated IP address. This typically occurs when an isolated network is attached or becomes a part of a larger network containing the IP address server. Such attachments are made through use of repeaters, routers, and other devices compatible with the physical architecture of the network.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2A shows a stand-alone IP network isolated from any other networks, while FIG. 2B shows the isolated IP network of FIG. 2A that has access to other networks through one of the IP hosts acting as a gateway.

FIGS. 5A–5C illustrate the use of IP hosts that automatically generate their IP addresses while on a stand-alone IP network and then subsequently receive an assigned IP address when they are connected to a corporate IP network. FIG. 5A illustrates the IP network address automatically generated in each case. FIG. 5B shows the connection with the corporate IP network and Internet, including the addition of the assigned IP addresses from an IP address server available on the corporate network, and FIG. 5C shows the discontinued use of the automatically generated IP addresses.

DETAILED DESCRIPTION OF THE PREFERRED EMBODIMENTS

As used herein, the term "hashing function" refers to those functions known in the art that systematically covert one multi-bit representation into another, usually smaller, multi-bit representation. A hashing function is said to be deterministic if it generates the same results from the same input.

As used herein, the term "IP address server" refers to a host on the IP network that will manage and assign IP addresses to other hosts. Such a server may use the Dynamic Host Configuration Protocol (DHCP) to assign IP addresses to the network hosts.

As used herein, the term "host" refers to any separately cognizable entity on an IP network. While there is typically a single IP address for each host, it is conceivable that a single host may have multiple IP addresses. References throughout the application to information available to the host refers to information that may be accessed or generated by the host processor and includes by way of example and not limitation, the network interface card IEEE 802 Ethernet address on conventional PCs and other Ethernet compatible devices, random number generators available from the host operating system, hardware serial numbers available on the host, etc.

Figure 1:
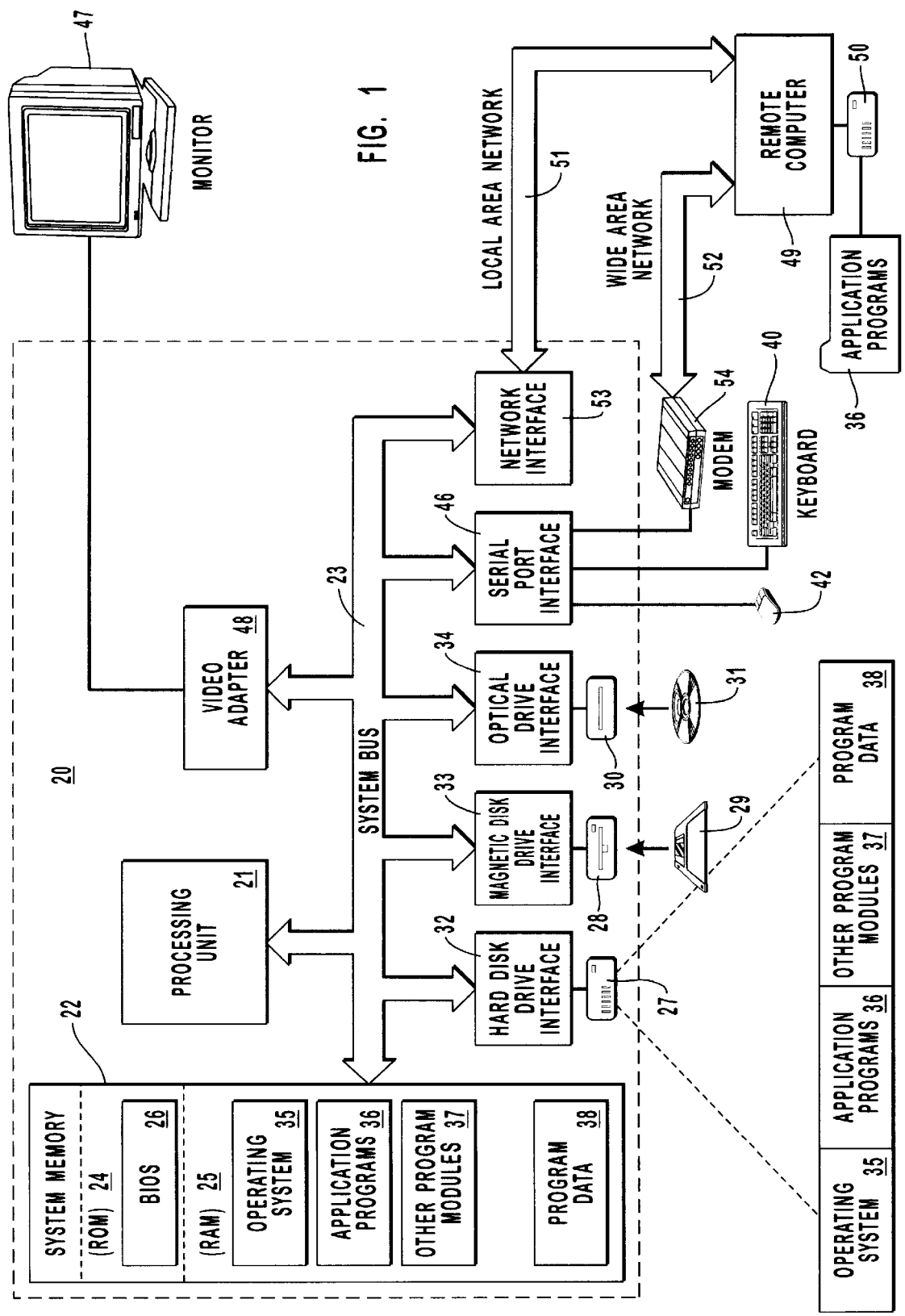
FIG. 1 is a block diagram of an exemplary system for implementing the invention that includes a general purpose computing device in the form of a conventional personal computer.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, may be stored in ROM 24. The personal computer 20 may also include a hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2B:
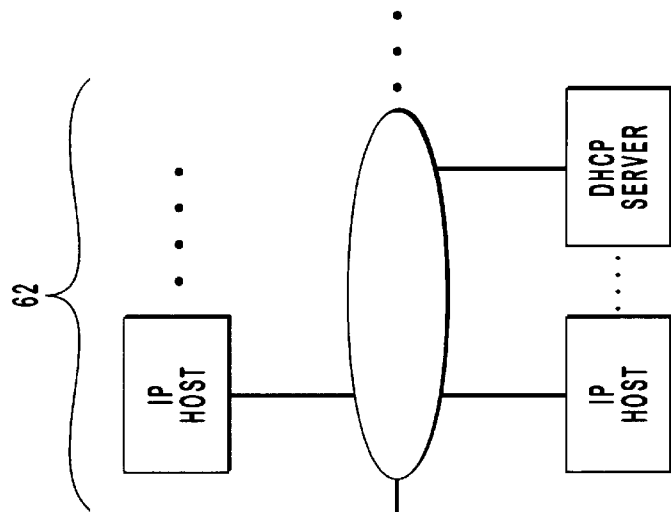
FIGS. 2A and 2B show two different configurations of an IP network.
Figure 2A:
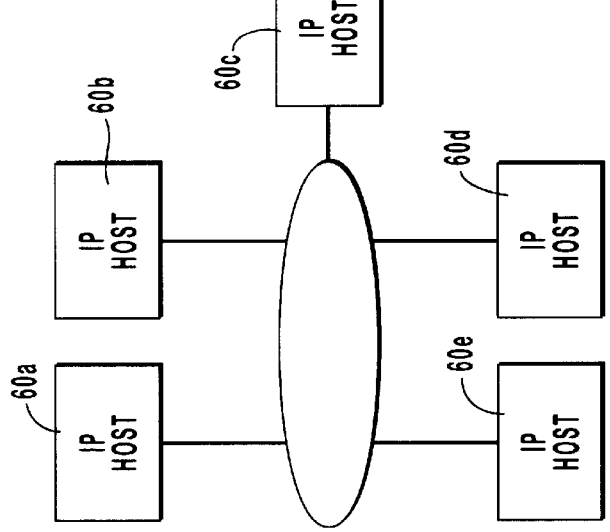
Figure 2A:
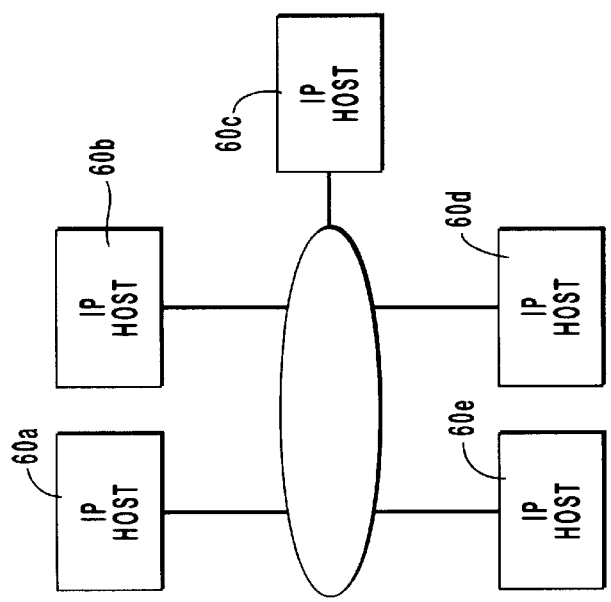

Referring to FIG. 2A, a number of IP hosts 60a–60e are shown interconnected in a stand-alone IP network. Each of the IP hosts 60a–60e will have a separate IP address and be able to communicate with each of the other IP hosts. Furthermore, each of the IP hosts may be a conventional computer system as described in connection with FIG. 1 running appropriate IP communication software. The IP communications software and the network interface 53 together constitute a means for communicating over an IP network. Note that the network shown in FIG. 2A could be a LAN in a small department of a company, in a small business, or in a home.

Referring to FIG. 2B, the stand-alone network shown in FIG. 2A is interconnected with another network through the IP host 60c. The existing network(s) may have an IP address server that could assign addresses to the IP hosts 60a–60e. A situation as shown in FIG. 2B may occur when a department LAN is interconnected to the corporate network. In this a situation, each of the IP hosts 60a–60e would now receive an IP address from the IP address server on the existing network 62 and may eventually cease using the automatically generated IP address; such a scenario will be shown hereafter in more detail in connection with FIGS. 5A–5C.

Figure 3A:
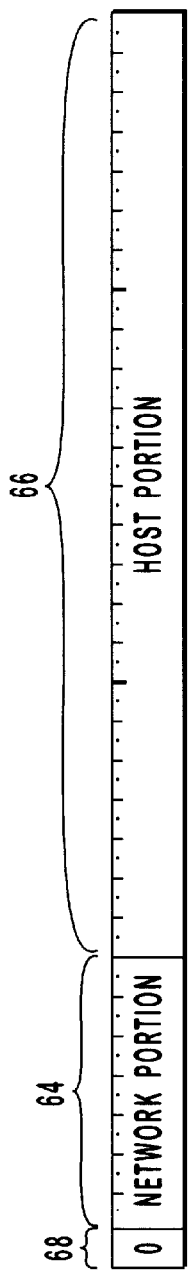
FIGS. 3A–3C illustrate the three different configurations of an IP address wherein a certain number of bits in the fixed 32-bit IP address space are assigned to a network portion, while other bits are assigned to a host portion.
Figure 3B:
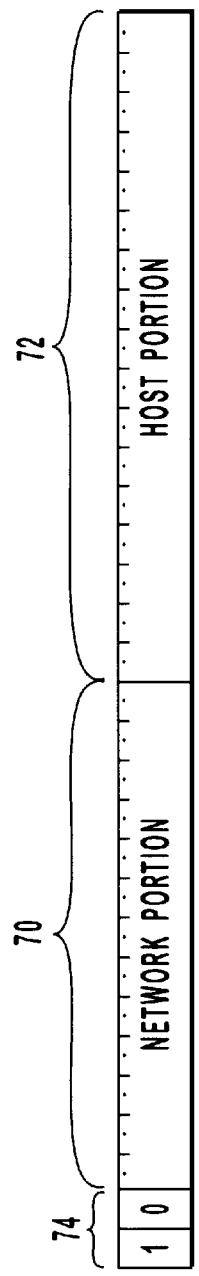
Figure 3C:
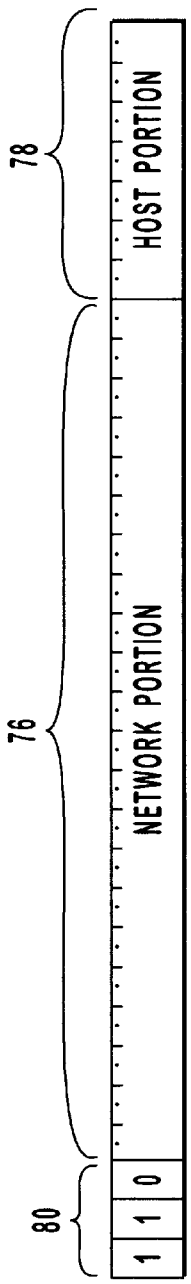

Referring now to FIGS. 3A–3C, three different formats of an IP address are shown. An IP address is divided into three portions or regions: a format indication portion, a network identifying portion, and a host identifying portion. The relative number of bits assigned to each of these portions will determine the maximum number of entities that can be supported by a particular addressing format. For example, allocating more bits to the host identifying portion will increase the number of hosts that can exist on a single network. Reducing this number of bits will allow more networks to be supported but reduce the maximum number of hosts per network. The three standard formats provides flexibility and all IP hosts are able to recognize each of the three formats.

FIG. 3A shows an IP address format having a relatively small network identifying portion 64 of 7 bits and a correspondingly larger host identifying portion 66 having 24 bits. This particular IP address format is indicated by reserved bit 68 having a value of zero.

In like manner, FIG. 3B shows an IP address format wherein the network identifying portion 70 is composed of 14 bits and the host identifying portion 72 is composed of 16 bits and is indicated by a value of '10' for the reserved bits 74. The IP address format of FIG. 3B gives approximately equal addressing capability to designate the network and the host.

Finally, FIG. 3C shows an IP address format wherein the network identifying portion 76 has 21 bits, the host identifying portion 78 has 8 bits, and the indicating bits 80 have a value of '110'. Naturally, the format of FIG. 3C will give greater addressing capability to the network identifying portion at the expense of being able to identify a smaller number of hosts. In each of the three IP addressing formats shown in FIGS. 3A–3C, there is a network identifying portion that indicates the network whereon the host resides and a host identifying portion that identifies the particular host on the designated IP network.

Any of the three formats may be used when automatically generating an IP address since all IP hosts recognize each format and different IP hosts may use different formats on any given IP network. It may be advantageous in some circumstances to select the format shown in FIG. 3A since it will allow the most possible hosts to exist on a single network For an automatically generated IP address, some convention needs to be chosen so that the network portion is the same for all IP hosts on the same network. For example, each IP host 60a–60e shown in FIG. 2A that automatically generates its IP address would have the same number identified in the network portion regardless of format in order to conform with the IP address standard.

One embodiment of the invention will always select the value of "10" for the network identifying portion of the automatically generated IP address. This value, known as "net 10," was the value used for the DARPA net, the historical predecessor to the current day Internet. In order to reduce confusion, the IANA will not assign "net 10" to any existing organization. Therefore, the "net 10" value for the network identifying portion of an IP address is relatively safe from conflict and has been used for debugging purposes and for internal networks within a corporate network structure.

Another embodiment will use a specifically reserved value for the network identifying portion of the IP address that has been assigned by the IANA for automatically generated IP network addresses. One such reserved or assigned value is 169.254.

Yet another way of consistently determining or obtaining the network identifying portion of an IP address is to use a network protocol for obtaining the information for the portion directly or indirectly from other devices attached to the network. Those skilled in the art will also appreciate that other mechanisms may also exist that would allow consistent and predictable generation of the same network identifying portion of an IP address that would work with the present invention are possible.

Figure 4:
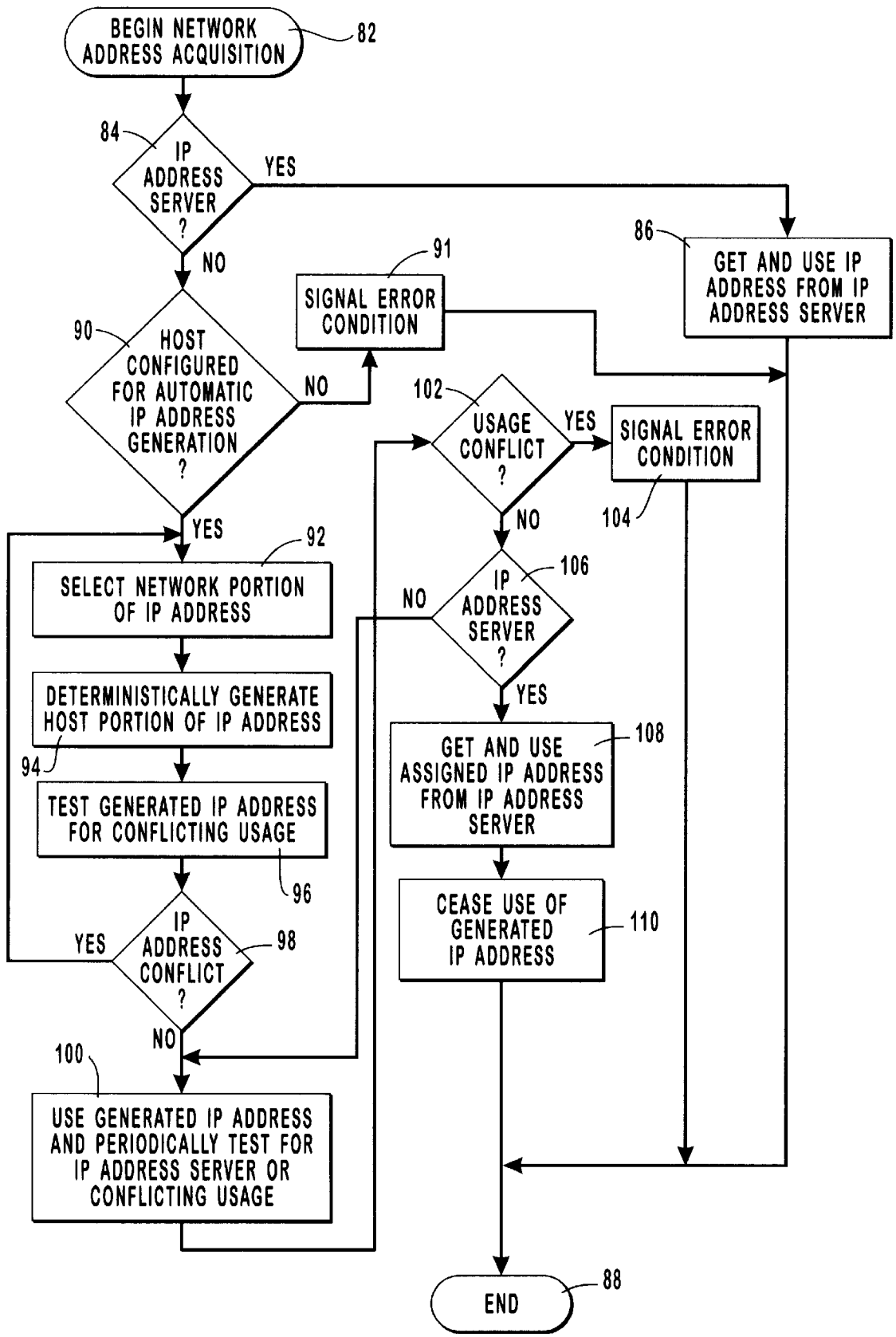
FIG. 4 is a flow chart depicting the processing steps that a IP host would take to automatically generate an IP address for use on an IP network where an IP address server is initially not present.

Referring now to FIG. 4, a flow chart showing the process steps taken by an actual IP host according to one embodiment of the present invention is shown. IP address acquisition begins at step 82 and it is first determined whether an IP address server is present at step 84. If there is an IP address server, there is no need to automatically generate an IP address and subsequently an IP address will be received from the IP address server at step 86.

To test for the IP address server at step 84, the IP host will send messages over the IP network according to a certain protocol, such as DHCP, to identify itself to the IP address server. The IP address server may then participate in a session that allows the assignment of an IP address from the IP address server to the IP host, again according to a prescribed protocol, such as DHCP. Using such a protocol is a means for determining the presence or absence or an IP address server. After receiving the IP address at step 86, the host will use that IP address indefinitely and the IP address acquisition operation terminates at step 88.

If an IP address server is not available at step 84 as the host boots up on the IP network and gives the appropriate protocol to signal a desire for an IP address, a determination is made at step 90 whether the host is configured for automatic IP address generation. If the host is not configured for automatic IP address generation, an error condition will be signaled at step 91 before ending IP address acquisition at step 88. The error condition will signal the user that IP network communications are not possible at that particular time.

After determining that the host is configured for automatic IP address generating at step 90, the network identifying portion of the IP address will be selected at step 92. As explained previously, one embodiment chooses the "net 10" value for the network identifying portion of the IP address. An important element is to consistently select the same network number value regardless of the method implemented for making that selection. For example, a fixed number may be always chosen (e.g., "net 10" or a "reserved" value), a common number may be accessed in a predetermined manner from a file, from the network, or from some other source, etc., and all such methods would be considered means for consistently selecting the network identifying portion of an IP address. Furthermore, as explained previously, any format of the IP address as shown in FIGS. 3A–3C may be used.

Next, the host identifying portion of the IP address is deterministically generated at step 94. One preferred way of generating the host identifying portion of the IP address is to begin with a known value available to the IP host and use a deterministic hashing algorithm to generate the host portion of the IP address. For example, the network interface card IEEE 802 Ethernet address, which is too large to fit directly into the host identifying portion of an IP address, may be deterministically hashed to arrive at a value that will fit within the length confines of the host portion of the IP address. Other values available to an IP host may also be used, such as random number generation from the host operating system, mother board serial numbers, etc. The IEEE 802 Ethernet address value is preferred due to its globally unique nature that, with the use of an appropriate deterministic hashing algorithm, would result in less usage conflicts for an automatically generated IP address and its high availability in PC networks.

Any other method that results in a high likelihood that each host will generate a unique, deterministic value for the host identifying portion may be used and would in like manner be considered a means for deterministically generating the host identifying portion of an IP address. It is preferred that the process be computationally efficient as well to eliminate large delays in the generation process.

A preferred hashing algorithm will be deterministic in the sense that a given input will generate the same output each time the algorithm is applied. The hashing algorithm should also be capable of being rehashed in the event that a usage conflict occurs wherein the host identifying portion generated by the original hash corresponds to an address already in use. Rehashing is generally performed by feeding the results of the first hash back into the algorithm to generate a new output. Finally, the hashing algorithm should have a good avalanche characteristic in order to more evenly spread out the hash results across the available values.

Before using the automatically generated IP address, it is tested for conflicting usage by other IP hosts on the network at step 96. One way of or means for doing such testing is for the IP host to send a message out on the IP network addressed to the automatically generated IP address. If a response is received, then another host on the IP network is using that particular IP address. Those skilled in the art will recognize that other ways and variations for determining IP address conflicts exist, any one of which may be used for purposes of testing an IP address for conflicting usage. All that is required is for the host to determine if another host on the network is already using the generated IP address.

If an IP address usage conflict is identified at step 98, the IP address is regenerated in the manner explained previously in connection with steps 92 and 94. Note that since "net 10" is chosen for the network identifying portion of the IP address for this embodiment, only the host identifying portion of the IP address need be regenerated. This is typically done by rehashing the IEEE 802 Ethernet address and testing the new rendition of the generated IP address having the newly generated host identifying portion for usage conflict again at step 96. This process will occur for a predetermined number of times or until no conflict usage is identified at step 98. Note that rehashing is only one means of regenerating the IP address and those skilled in the art will recognize others that accomplish the same purpose.

At step 100, the generated IP address is used by the IP host for communicating on the IP network. Also at step 100 periodic tests are made to determine if an IP address server has become available over the IP network since the IP address was generated or to determine if there is conflicting usage of the IP address. Each of these two situations may indicate a change for the IP host in using the generated IP address depending on actual implementation. One way or means for monitoring conflicting IP address usage is to periodically send a message to the generated IP address and wait for a response as explained previously in connection with step 96.

If a conflict usage is identified at step 102 because the generated IP address is also being used by another IP host, then an error indication is signaled at step 104 before ending at step 88. Because this situation may be extremely detrimental and because the situation is very uncommon due to previous conflict testing at step 96, one embodiment will simply shut down the IP stack and no longer process network messages. The host user is then made aware through the user interface that a catastrophic error has occurred. Alternatively, rather than shut down the IP stack with an error, other embodiments may attempt to generate a new IP address.

If no conflicting usage is identified at step 102 and no IP address server has become available at step 106, use of the generated IP address continues at step 100 until more periodic tests are made. In one embodiment, testing for an IP address server is done by sending messages according to the DHCP protocol. Note that this test can be the same test described in conjunction with step 84 above and serves as a means for ascertaining if an IP address server later becomes available.

If an IP address server later becomes available at step 106, the IP host will interact with the address server in order to get another IP address at step 108. DHCP is one protocol that may be implemented as a means for requesting and receiving an IP address for an IP host. This address will then be used by the IP host while use of the generated IP address will eventually cease at step 110 before ending address acquisition at step 88. Those skilled in the art will see that variations may exist wherein multiple IP addresses are used by a single IP host that will allow the automatically generated IP address to co-exist with the IP address assigned by the IP address server.

When ceasing to use the generated IP address at step 110, implementations may vary as to how quickly this may be achieved. For example, use of the generated IP address may be immediately cut off upon receipt of the IP address from the IP address server; only existing sessions with the generated IP address may be maintained thereby gradually decreasing the use of the generated IP address; or, finally, both addresses may be used simultaneously. Software running on the IP host will control the continued use or disuse (whether gradual or immediate) of the generated IP address according to a variety of factors. This software constitutes a means for gradually discontinuing the use of the generated IP address when gradual disuse is mandated by the implementation and the circumstances.

Figure 5C:
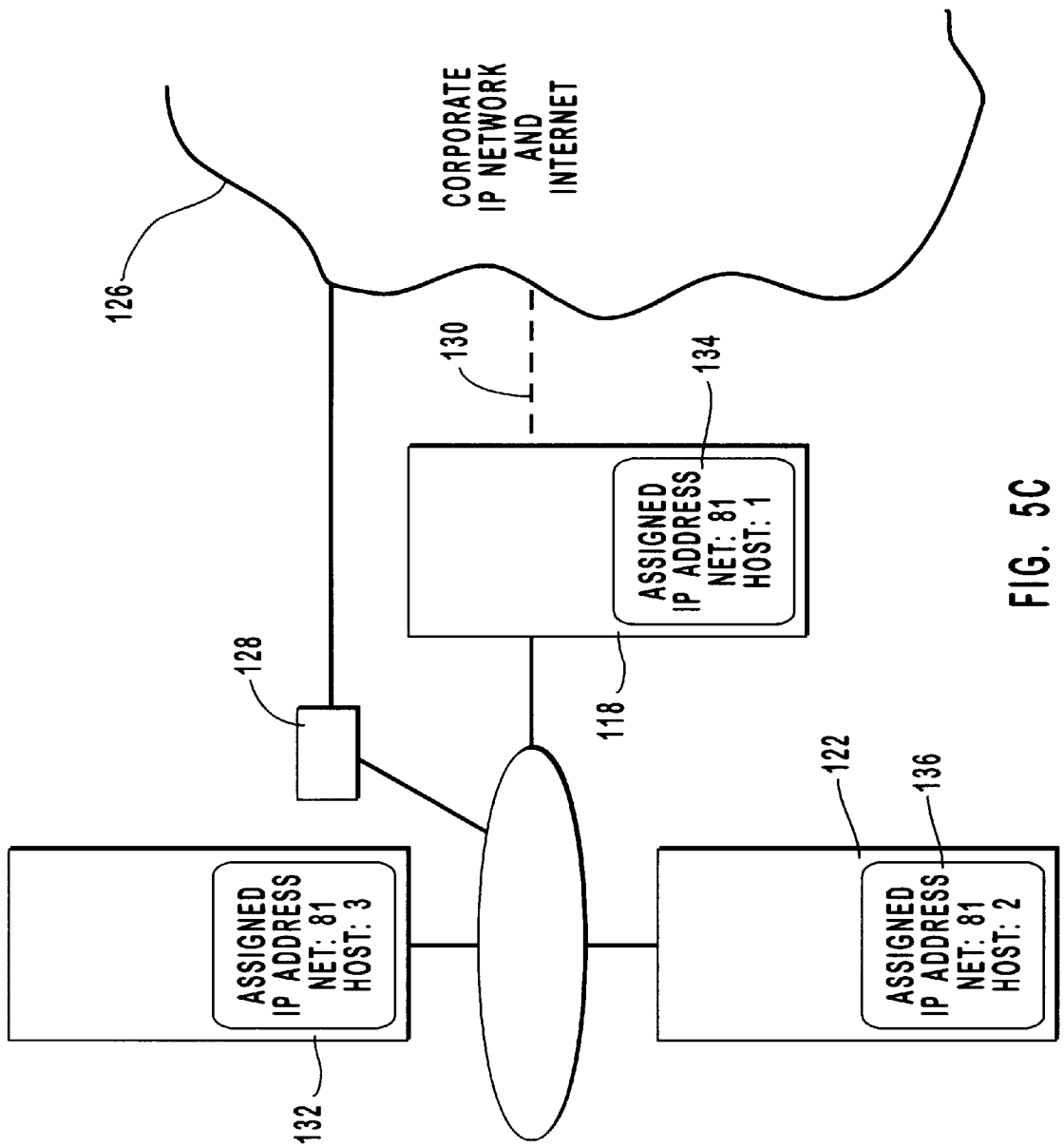

Referring now to FIGS. 5A–5C, an example implementation of the present invention is shown as IP addresses are initially generated on a local area network that is eventually integrated into the corporate-wide network having an IP address server. Furthermore, the corporate network is connected to the Internet. FIG. 5A shows the state of the independent local area network after each of the three IP hosts has automatically generated their respective IP addresses. FIG. 5B then shows the state of the local area network after integration into the corporate IP network and wherein each of the three IP hosts has received an address from the corporate IP address server and showing the simultaneous use of the generated IP address and the assigned IP address as the generated IP address is gradually phased out. Finally, FIG. 5C shows the state of the local area network after the generated IP addresses are no longer in use for each of the three nodes.

Referring to the network 112 of FIG. 5A, each IP host has automatically generated and tested an IP address according to the processing steps explained previously in connection with the flowchart of FIG. 4. Specifically, host 114 is using generated IP address 116 having a value of 10.0.0.107, host 116 is using generated IP address 120 having a value of 10.0.3.255, and host 122 is using generated IP address 124 having a value of 10.0.0.7.

One or more of the generated IP addresses may have had an initial conflict but such has been resolved by rehashing to get a second or more order hash of the IEEE 802 Ethernet address found in the network interface card of the conventional PC that makes up each respective host. In most instances, each time a host is powered on and "active" on the network 112, it will have the same IP address due to the deterministic nature of the hashing algorithm generating the host identifying portion of the address. This configuration allows the respective IP hosts to be physically attached to the network hardware, powered on, and immediately communicating on the network 112 without the need of any explicit configuration with respect to an IP address.

Referring to FIG. 5B, the network 112 is integrated into a corporate IP network 126 through suitable router hardware 128. Note that, alternatively, one of the IP hosts, such as host 120 could function as a router to make the logical integration of the network 112 into the corporate IP network 126 as represented by dashed line 130. Furthermore, the corporate IP network 126 is part of the world-wide Internet.

Once connected onto the corporate IP network, an IP address server will become available to each respective host 114, 118, and 122. Each host will "discover" the IP address server during execution of a periodic test as described in connection with step 100 of FIG. 4. After going through the appropriate interaction, such as DHCP, each respective host 114, 118, and 122 will receive an assigned IP address from the IP address server. Specifically, host 114 is using assigned IP address 132 having a value of 81.0.0.1, host 116 is using assigned IP address 134 having a value of 81.0.0.2, and host 122 is using assigned IP address 136 having a value of 81.0.0.3.

The assigned IP address will now be used while the generated IP address will be gradually phased out from use. In one embodiment, existing sessions using the IP address will continue until ended while all new sessions will use the assigned IP address received from the IP address server. With respect to the configuration shown in FIGS. 5A–5C, it is only the hosts within the network 112 that will be using the generated IP addresses. Note also that once the network 112 is attached to the corporate IP network 126, a chance of conflicts occurs with existing addresses on the corporate IP network 126 that could lead to the error situation discussed with processing steps 102 and 104 of FIG. 4.

Referring to FIG. 5C, each respective node 114, 118, and 122 has ceased using the generated IP address and is only using the assigned IP address. Each time one of the hosts 114, 118, or 122 powers up and becomes active on the network 112 (and subsequently the corporate IP network 126) it will use its respective assigned IP address.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a host that has been connected to a network that does not have an IP address server and is not connected with any network having an IP address server, a method for automatically generating an IP address for the host, without another component of the network being required to transmit, to the host over the network, an IP address of said other component, the method comprising the steps of:

without the host having received over the network any IP address of another component of the network, selecting a valid network identifying value as a network identifying portion of the IP address for the host;

without the host having received over the network said any IP address of another component of the network, generating a host identifying portion of the IP address for the host based on information available to the host; and testing the generated IP address for the host for conflicting usage by another host on the network and determining that no conflicting usage of the generated IP address exists.

2. A method as recited in claim 1, wherein the network identifying portion of the generated IP address is chosen to be 10.

3. A method as recited in claim 1, further comprising the steps of:

determining that an IP address server is not present prior to selecting the network identifying portion of the IP address; and ascertaining if an IP address server later becomes present over the network.

4. A method as recited in claim 3, further comprising the steps of:

assigning an IP address from the IP address server to the host when an IP address server is available over the IP network; and immediately discontinuing use of the generated IP address when an assigned IP address is received from an IP address server available over the network.

5. A method as recited in claim 3, further comprising the steps of:

assigning an address from the IP address server to the host when an IP address server is available over the network; and gradually discontinuing use of the generated IP address when an assigned IP address is received from an IP address server available over the network.

6. A method as recited in claim 3, further comprising the step of assigning an IP address from the IP address server to the host when an IP address server is available over the network and the host using both the generated IP address and the assigned IP address.

7. A method as recited in claim 1, further comprising the step of monitoring the network for conflicting IP address usage between the generated IP address and the address of another host.

8. A method as recited in claim 1, wherein the generated IP address has been generated after the host has previously generated a first IP address and has determined that the first IP address was already in use by another host on the network.

9. A method as recited in claim 1, wherein testing the generated IP address further comprises sending a message using the generated IP address and waiting for a response from another host that is currently using the generated IP address.

10. A method as recited in claim 1, wherein an IEEE 802 address of a host network interface card is used as the information available to the host for generating the host identifying portion of the generated IP address.

11. A method as recited in claim 1 wherein generating the host portion of the generated IP address further comprises the use of a deterministic hashing function.

12. A computer-readable medium having computer-executable instructions for performing the steps recited in claim 1.

13. In a host that has been connected to a network that initially does not have an IP address server and is not connected with any network having an IP address server, a method for automatically generating an IP address for the host, without another network component being required to transmit, to the host over the network, an IP address of said other network component, the method comprising the steps of:

after the host has been connected to the network, initially determining that an IP address server is not available over the network;

selecting a valid network identifying value as a network identifying portion of the IP address for the host without the host having received the valid network identifying value from another component of the network;

deterministically generating a host identifying portion of the IP address for the host based on information available to the host, the information available to the host being information other than a host identifying portion of an IP address for any other host;

testing the generated IP address for the host for usage conflict by another host on the network and determining that no conflicting usage of the generated IP address exists; and ascertaining if an IP address server later becomes available over the network.

14. A method as recited in claim 13, wherein the network identifying portion of the generated IP address is chosen to be 10.

15. A method as recited in claim 13, further comprising the steps of:

requesting and receiving an assigned IP address from the IP address server when an IP address server becomes available over the network; and immediately discontinuing use of the generated IP address when the assigned IP address is received from the IP address server available over the network.

16. A method as recited in claim 13, further comprising the steps of:

requesting and receiving an assigned IP address from the IP address server when an IP address server becomes available over the network; and gradually discontinuing use of the generated IP address when the assigned IP address is received from the IP address server available over the network.

17. A method as recited in claim 16, further comprising the steps of:

monitoring the generated IP address for conflicting usage while the host is using the generated IP address; and signaling an error condition if there is conflicting usage with another host on the network while the host is using the generated IP address.

18. A method as recited in claim 17, wherein an IEEE 802 address of a host network interface card is the information available to the host and the IEEE 802 address is placed into a deterministic hashing function for generating the host identifying portion of the generated IP address.

19. A computer-readable medium having computer-executable instructions for performing the steps recited in claim 18.

20. A method as recited in claim 13, further comprising the steps of requesting and receiving an assigned IP address from an IP address server when the IP address server becomes available over the network; and using both the generated IP address and the assigned IP address.

21. A method as recited in claim 13, further comprising the steps of:

monitoring the generated IP address for conflicting usage while the host is using the generated IP address; and regenerating the generated IP address if there is conflicting usage with another host on the network while the host is using the generated IP address.

22. A method as recited in claim 13, wherein the generated IP address has been generated after the host has previously generated a first IP address and has determined that the first IP address was already in use by another host on the network.

23. A method as recited in claim 13, wherein testing the generated IP address further comprises the steps of:

sending a message using the generated IP address; and waiting for a response from a host that is currently using the generated IP address.

24. A computer-readable medium having computer-executable instructions for automatically generating a host IP address in a host that has been connected to a network that does not have an IP address server initially without another component of the network being required to transmit an IP address of the other component to the host, said computer-executable instructions comprising:

means for communicating over the network;

after the host has been connected to the network, means for determining that an IP address server is not currently available over the network;

means for consistently selecting the network identifying portion of the host IP address from valid network identifying portion values without the host having received the valid network identifying portion values from another component of the network;

means for deterministically generating the host identifying portion of the host IP address based on information available to the host;

means for testing the generated host IP address for conflicting usage by another host on the network before using the generated host IP address, the information available to the host being information other than a host identifying portion of an IP address for any other host;

means for monitoring the generated host IP address for conflicting usage by another host on the network while the generated host IP address is being used;

means for ascertaining if the IP address server later becomes available over the network;

means for requesting and receiving a new IP address from the IP address server when the IP address server becomes available over the network; and means for gradually discontinuing use of the generated host IP address when the IP address server becomes available over the network.

25. A computer-readable medium having computer-executable instructions as recited in claim 24, wherein the network identifying portion of the IP generated IP address is chosen to be 10.

26. A computer-readable medium having computer-executable instructions as recited in claim 24, wherein the means for testing the generated host IP address comprises sending a message using the generated host IP address and waiting for a response from a different host that is currently using the generated host IP address.

27. A computer-readable medium having computer-executable instructions as recited in claim 24, wherein the means for generating the host identifying portion of the generated host IP address comprises placing an IEEE 802 address of a host network interface card into a deterministic hashing function.

28. A computer-readable medium having computer-executable instructions as recited in claim 24, wherein the computer-executable instructions further comprise means for regenerating the generated host IP address if testing the generated host IP address results in conflicting usage with another host on the network.

29. A computer-readable medium having computer-executable instructions as recited in claim 24, wherein the computer-executable instructions further means for signaling an error condition if there is conflicting usage with another host on the network while the host is using the generated host IP address.

30. In a host that has been connected to a network that does not have an IP address server and is not connected with any network having an address server, a method for automatically generating an IP address for the host, without another component of the network being required to transmit, to the host over the network, an IP address of said other component, the method comprising the steps of:

without the host having received over the network any IP address of another component of the network, selecting a valid network identifying value as a network identifying portion of the IP address for the host; and without the host having received over the network said any IP address of another component of the network, generating a host identifying portion of the IP address for the host based on information available to the host.

31. A method as recited in claim 30, further comprising the steps of:

determining that an IP address server is not present prior to selecting the network identifying portion of the IP address; and ascertaining if an IP address server later becomes present over the network.

32. A method as recited in claim 30, further comprising the steps of:

assigning an IP address from the IP address server to the host when an IP address server is available over the IP network; and immediately discontinuing use of the generated IP address when an assigned IP address is received from an IP address server over the network.

33. A method as recited in claim 30, further comprising the steps of:

assigning an IP address from the IP address server to the host when an IP address server is available over the IP network; and gradually discontinuing use of the generated IP address when an assigned IP address is received from an IP address server available over the network.

34. A method as recited in claim 30, further comprising the step of testing the generated IP address for the host for conflicting usage by another host on the network and determining that no conflicting usage of the generated IP address exists.

35. A method as recited in claim 30, wherein the generated IP address has been generated after the host has previously generated a first IP address and has determined that the first IP address was already in use by another host on the network.

* * * * *

UNITED STATES PATENT AND TRADEMARK OFFICE
CERTIFICATE OF CORRECTION

PATENT NO. : 6,101,499  
DATED : August 8, 2000  
INVENTOR(S) : Peter S. Ford; Pradeep Bahl; Jawad Mohammed J. Khaki; Greg Burns; Frank J. Beeson Page 1 of 1

It is certified that error appears in the above-identified patent and that said Letters Patent is hereby corrected as shown below:

Column 2,  
Line 24, after "address" delete [as]

Column 3,  
Line 24, before "IP" change "a" to -- an --

Column 4,  
Line 45, before "IP" change "a" to -- an --  
Line 63, after "systematically" change "covert" to -- convert --

Column 7,  
Line 21, after "formats" change "provides" to -- provide --

Column 11,  
Line 67, after "only as" change "illustrated" to -- illustrative --

Signed and Sealed this

Thirtieth Day of October, 2001

*Attest:*

NICHOLAS P. GODICI  
*Attesting Officer*    *Acting Director of the United States Patent and Trademark Office*